United States Patent
Huang et al.

(10) Patent No.: US 12,122,356 B2
(45) Date of Patent: Oct. 22, 2024

(54) HYBRID POWER SYSTEM CONTROL METHOD AND SYSTEM, AND ELECTRIC VEHICLE

(71) Applicant: GUANGZHOU AUTOMOBILE GROUP CO., LTD., Guangzhou (CN)

(72) Inventors: Siran Huang, Guangzhou (CN); Chengfei Zhao, Guangzhou (CN); Ruiyang Deng, Guangzhou (CN); Jianqi Long, Guangzhou (CN); Dongsheng Wu, Guangzhou (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 282 days.

(21) Appl. No.: 17/781,140

(22) PCT Filed: Jun. 4, 2021

(86) PCT No.: PCT/CN2021/098343
§ 371 (c)(1),
(2) Date: May 31, 2022

(87) PCT Pub. No.: WO2022/001578
PCT Pub. Date: Jan. 6, 2022

(65) Prior Publication Data
US 2022/0410869 A1    Dec. 29, 2022

(30) Foreign Application Priority Data

Jul. 1, 2020 (CN) .......................... 202010618315.8

(51) Int. Cl.
*B60W 20/17* (2016.01)
*B60W 20/20* (2016.01)
(Continued)

(52) U.S. Cl.
CPC ............ *B60W 20/17* (2016.01); *B60W 20/20* (2013.01); *B60W 10/06* (2013.01); *B60W 10/08* (2013.01);
(Continued)

(58) Field of Classification Search
CPC ...... B60W 20/17; B60W 20/20; B60W 10/06; B60W 10/08; B60W 2510/0657; B60W 2520/10
See application file for complete search history.

(56) References Cited

U.S. PATENT DOCUMENTS

2006/0022469 A1*  2/2006  Syed .................. B60K 6/44
                                              290/40 C
2016/0009269 A1*  1/2016  Zhou .................. B60K 6/442
                                              180/65.23

* cited by examiner

*Primary Examiner* — John Kwon
(74) *Attorney, Agent, or Firm* — ScienBiziP, P.C.

(57) ABSTRACT

A control method and system for a hybrid power system, and an electric vehicle. The method includes: step S1, a control unit acquiring a real-time vehicle mode signal, vehicle speed data, and actual torque data of an engine; step S2, the control unit determining whether a power system of a vehicle is in a parallel mode, if the power system of the vehicle is in the parallel mode, the control unit sending a torque compensation signal to a drive electric motor; and step S3, the control unit determining positive and negative attributes of the torque compensation signal adjusting a compensation torque output value of the drive electric motor in real time. By means of the control method, gears connecting a drive electric motor to an engine can be prevented from generating tooth knocking noise, thereby greatly alleviating NVH during the driving of a vehicle.

7 Claims, 3 Drawing Sheets

(51) Int. Cl.
*B60W 10/06* (2006.01)
*B60W 10/08* (2006.01)
(52) U.S. Cl.
CPC ............... *B60W 2710/0666* (2013.01); *B60W 2710/083* (2013.01)

HYBRID POWER SYSTEM CONTROL METHOD AND SYSTEM, AND ELECTRIC VEHICLE

RELEVANT DISCLOSURE

The present disclosure claims the priority of the Chinese invention patent application with the invention name "a hybrid power system control method and system, and electric vehicle" submitted to the China Patent Office on Jul. 1, 2020, application No. 202010618315.8, and the whole content of which is hereby incorporated by reference.

TECHNICAL FIELD

The present disclosure relates to the technical field of automobile power system, in particular to a hybrid power system control method and system, and electric vehicle.

BACKGROUND

In recent years, motor hybrid technology has opened up new ways to realize a complete power matching between internal combustion engine and powered driving wheels. Among many power train design schemes, the most representative are series parallel hybrid system and power shunt hybrid system. In the series parallel hybrid system, the internal combustion engine-generator-drive motor-shaft-driven wheel form a series power chain. At the same time, internal combustion engine-shaft-driving wheel-accumulator-drive motor-shaft-driving wheel form a parallel power chain. The system can be used as an energy regulating device to provide independent regulation of speed and torque and give full play to the potential of the whole system.

There is a hybrid power system with series parallel configuration. Under the parallel working condition of medium high speed and low torque, the engine can be directly output to the wheel, the generator and the engine are connected and rotate together, and the drive motor is in the follow-up state. In this mode, the accuracy of torque output of the engine (especially a three-cylinder engine) is low, the torque fluctuates greatly, and there is a gap between the gears, which will cause the drive motor end gear and the intermediate shaft gear to knock each other, resulting in abnormal sound and vibration of the system.

As shown in FIG. 1, the series parallel hybrid system includes a control unit, an engine (ICE), a generator (EM1), a drive motor (EM2), and a connecting device and an intermediate shaft connecting the engine, the drive motor and the output shaft.

The structure has three working modes: pure electric mode, series mode, and parallel mode. In pure electric mode, the engine ICE and the generator EM1 do not work or rotate, and only the drive motor EM2 works and outputs power to the vehicle; in series mode, the engine ICE works to drive the generator EM1 to generate power, and the drive motor EM2 works and outputs power to the vehicle; in parallel mode, the working power of the engine ICE is directly output to the vehicle, and the generator EM1 generates power according to the demand, the drive motor EM2 is inoperative.

When the working mode is in parallel mode, the engine directly drives the vehicle, the motor EM2 is connected to the wheels in parallel, and EM1 is connected to the engine. In this mode, when the vehicle is running at a constant speed at medium high speed and small throttle, the engine is in the medium speed and low torque area, in this working area, the engine torque control is difficult, the accuracy is low, and the torque vibration is severe; in this case, the wheels are powered by the engine output, and the generator generates power according to demand to drive the motor to rotate, the drive motor itself does not output torque or use torque to generate power, and only maintains the speed through the torque transmitted by the wheels, therefore, when the engine torque fluctuates, the torque transmitted to the drive motor will change. The actual speed of the engine is Ne and the actual speed of the drive motor is Nt, under ideal conditions, Ne=Nt, however, due to large fluctuations of the actual output torque of the engine, there is an error between the actual engine speed Ne and the required engine speed, which will lead to a speed difference between the engine and the drive motor.

When the actual torque Tact output by the engine is greater than the required torque Treq of the engine, the speed of the intermediate shaft will increase, if the intermediate shaft gear is pressing the drive motor end gear in the negative direction at this time, it will quickly turn to pressing in the positive direction, resulting in vibration and abnormal sound.

When the actual torque Tact output by the engine is less than the required torque Treq of the engine, the speed of the intermediate shaft will reduce, if the intermediate shaft gear is pressing the drive motor end gear in the positive direction at this time, it will quickly turn to pressing in the negative direction, resulting in vibration and abnormal sound.

When the engine torque fluctuates repeatedly, the gear will be knocked back and forth between the positive and negative directions, resulting in continuous abnormal noise, affecting the NVH (noise, vibration, harshness) quality of the whole vehicle.

SUMMARY OF THE DISCLOSURE

The problem solved by the embodiment of the present disclosure is the drive motor end gear and the intermediate shaft gear knocking against each other at different speeds, resulting in abnormal sound and vibration of the system.

One aspect of the present disclosure provides a control method of a hybrid power system, including:
- step S1, a control unit obtains a real-time vehicle mode signal, vehicle speed data and actual torque data of an engine;
- step S2, the control unit determines whether a power system of a vehicle is in parallel mode according to the vehicle mode signal, if the power system of the vehicle is in the parallel mode, the control unit sends a torque compensation signal to a drive motor and controls the drive motor to output compensation torque; if the power system of the vehicle is not in the parallel mode, the control unit sends a zero torque signal to the drive motor and controls the drive motor to output zero torque;
- step S3, the control unit determines positive and negative attributes of the torque compensation signal according to the vehicle speed data and the actual torque data of the engine and adjusts compensated torque output value of the drive motor in real time.

Further, in step S2, the control unit sends a torque compensation signal to a drive motor and controls the drive motor to output compensation torque, includes at least one of following steps:

the drive motor stops following rotation and cooperatively drives to output a driving force in a positive direction to an intermediate shaft gear after receiving the torque compensation signal;

the drive motor stops following rotation and outputs a resistance in a opposite direction to the intermediate shaft while generating power after receiving the torque compensation signal; or the driving motor outputs zero torque, stops driving or power generation of a wheel, and synchronizes the wheel to follow-up after receiving the zero torque signal.

Further, in step S3, the determines positive and negative attributes of the torque compensation signal, includes:

comparing a real-time actual torque of the engine with a required torque of the engine;

determining an increase of a speed of the intermediate shaft produces a positive pressing force, determining the drive motor needs to output a negative direction compensation torque, the control unit outputs the torque compensation signal whose attribute is negative if the actual torque of the engine is greater than the required torque of the engine.

Further, in step S3, the determines positive and negative attributes of the torque compensation signal, includes:

comparing a real-time actual torque of the engine with a required torque of the engine;

determining a reduction of a speed of the intermediate shaft produces a negative pressing force, determining the drive motor needs to output a positive direction compensation torque, the control unit outputs the torque compensation signal whose attribute is positive if the actual torque of the engine is less than the required torque of the engine.

Further, in step S3, the adjusts compensated torque output value of the drive motor in real time, includes:

adjusting output direction of the drive motor according to the attribute of the torque compensation signal output by the control unit and adjusting output value of the drive motor to a minimum difference between the actual torque of the engine and the required torque of the engine.

The present disclosure further provides a control system of a hybrid power system, the system operates the control method of the hybrid power system to control an electric vehicle hybrid system.

The present disclosure further provides an electric vehicle, the electric vehicle includes the control system of the hybrid power system.

To sum up, the embodiment of the present disclosure has the following beneficial effects:

The control method, control system and electric vehicle of the hybrid power system provided by the present disclosure, the hybrid power configuration is under the parallel working condition of medium and high speed and uniform speed, controls the reverse output small torque of the drive motor (EM2), makes the rotor gear of the drive motor (EM2) closely fit the gear of the engine (ICE), and prevents the abnormal sound of tooth knocking of the gear connected between the drive motor (EM2) and the engine (ICE), greatly improve NVH (noise, vibration, harshness) when driving the whole vehicle.

BRIEF DESCRIPTION OF THE DRAWINGS

In order to more clearly explain the technical scheme of the embodiment of the present disclosure, the following will briefly introduce the drawings needed to be used in the description of the embodiment of the present disclosure. Obviously, the drawings in the following description are only some embodiments of the present disclosure. For those skilled in the art, other drawings can be obtained according to these drawings without paying creative work.

DETAILED DESCRIPTION

In order to make the object, technical scheme and advantages of the present disclosure more clearly, the present disclosure will be further described in detail in combination with the accompanying drawings.

Figure 2:
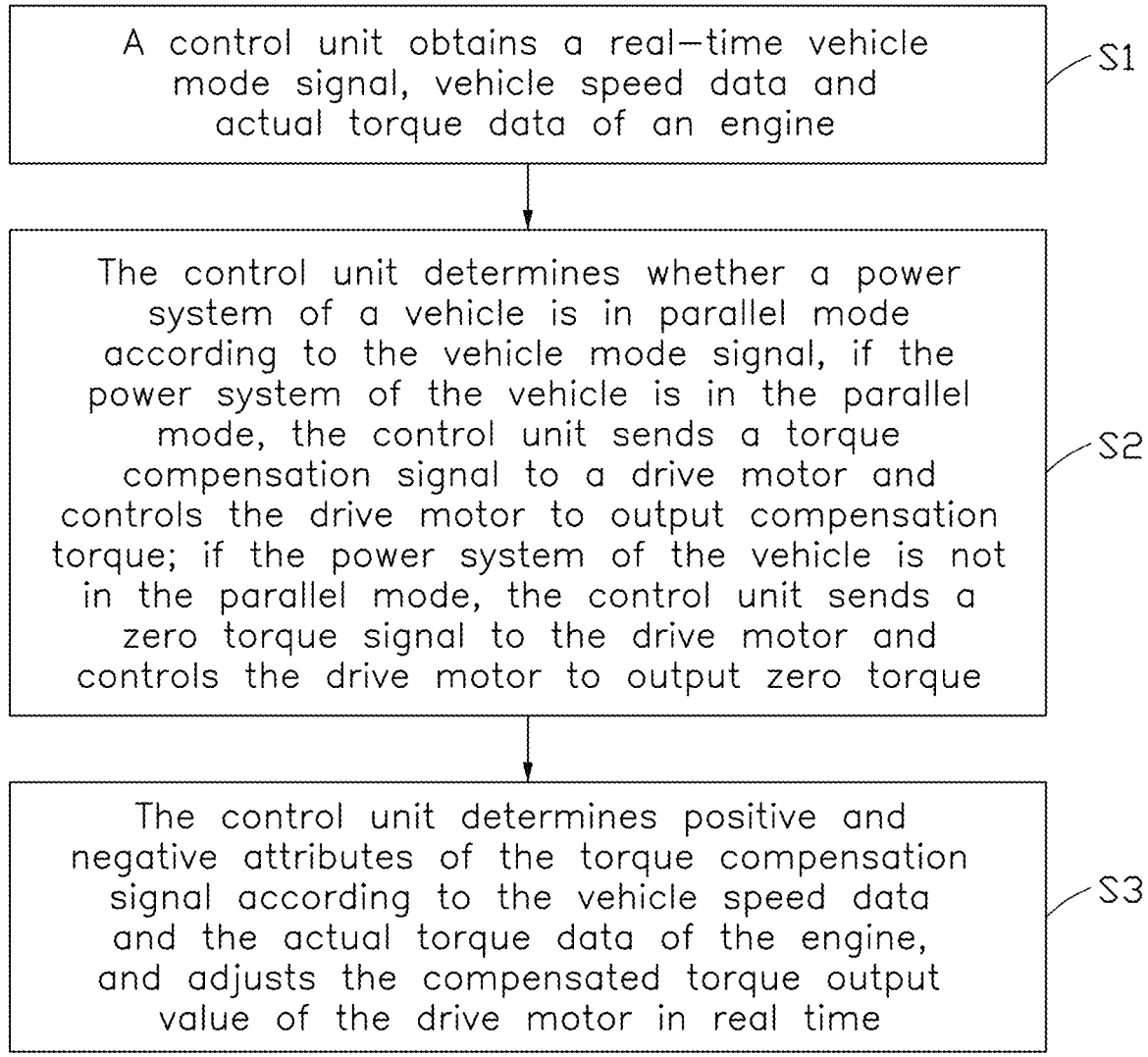
FIG. 2 is a flowchart of a hybrid power system control method according to the present disclosure.

FIG. 2 illustrates a hybrid power system control method in accordance with an embodiment of the present disclosure.

In the embodiment, the hybrid power system control method is applied to a hybrid power system with a series parallel configuration, and includes the following steps:

At step S1, a control unit obtains a real-time vehicle mode signal, vehicle speed data and actual torque Tact data of an engine through CAN bus.

At step S2, the control unit determines whether a power system of a vehicle is in parallel mode according to the vehicle mode signal, if the power system of the vehicle is in the parallel mode, the control unit sends a torque compensation signal to a drive motor and controls the drive motor to output compensation torque Tc; if the power system of the vehicle is not in the parallel mode, the control unit sends a zero torque signal to the drive motor and controls the drive motor to output zero torque.

In one specific embodiment, when the vehicle enters the parallel mode, the connecting device between the engine and the wheel is engaged, and the engine speed is coupled with the wheel speed, the most economical working range of the engine can be obtained from the engine speed; the control unit sends the torque compensation signal to the drive motor and controls the drive motor to output the compensation torque Tc, so that the intermediate shaft gear can always be pressed in one direction without knocking back and forth, to reduce vibration and abnormal noise. Two different situations can occur according to the different positive and negative values of the torque compensation signal: when the torque compensation signal is positive, the drive motor stops following the rotation after receiving the torque compensation signal, and cooperatively drives to output a driving force in a positive direction to the intermediate shaft gear. When the torque compensation signal is negative, the drive motor stops following after receiving the torque compensation signal, and outputs a resistance in the opposite direction to the intermediate shaft while generating power, so as to compress the intermediate shaft gear and lift NVH (noise, vibration and harshness).

Specifically, when the drive motor receives the zero torque signal, the output torque in compensation is zero, and the driving or power generation of the wheel is stopped, neither participate in the driving of the wheel nor generate electricity, start to synchronize the wheel for follow-up rotation, at this time, the zero torque control is carried out on the drive motor to make zero compensation in output torque of the drive motor.

At step S3, the control unit determines positive and negative attributes of the torque compensation signal according to the vehicle speed data and the actual torque Tact data of the engine, and adjusts the compensated torque Tc output value of the drive motor in real time.

Figure 3:
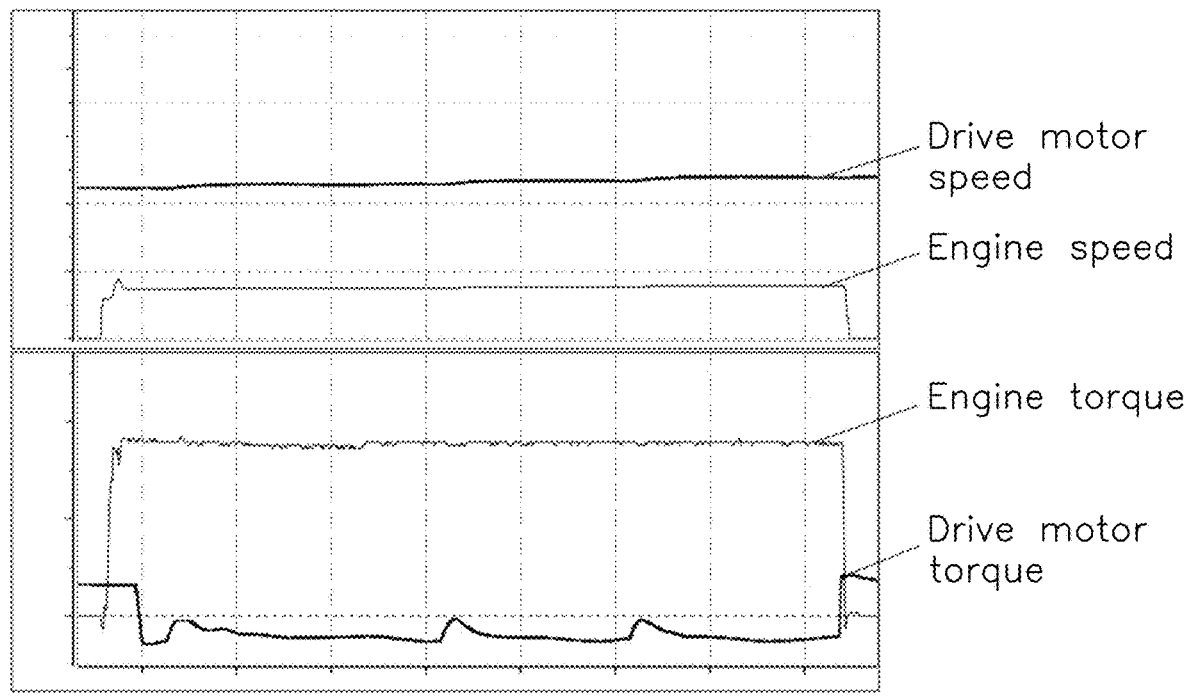
FIG. 3 is a torque diagram of the hybrid power system control method according to the present disclosure.

In one specific embodiment, the real-time actual torque Tact of the engine is compared with the required torque Treq of the engine, if the actual torque Tact of the engine is greater than the required torque Treq of the engine, it is determined that the increase of the speed of the intermediate shaft produces a positive pressing force, and it is determined that the drive motor needs to output a negative direction compensation torque Tc. The control unit outputs the torque compensation signal whose attribute is negative; if the actual torque Tact of the engine is less than the required torque Treq of the engine, it is determined that the reduction of the speed of the intermediate shaft produces a negative pressing force, and it is determined that the drive motor needs to output a positive direction compensation torque Tc. The control unit thus outputs the torque compensation signal whose attribute is positive; as shown in FIG. 3, the output direction of the drive motor is adjusted according to the attribute of the torque compensation signal output by the control unit, and the output value of the drive motor is adjusted to a minimum difference between the actual torque Tact of the engine and the required torque Treq of the engine. A compensation torque TC is determined according to the current vehicle speed and map, this torque may be positive or negative, and then send the required torque to the drive motor so that it will no longer follow the rotation, but will drive or will generate electricity, so that the intermediate shaft gear can always be pressed in one direction without knocking back and forth, so as to reduce vibration and abnormal noise, so as to press the intermediate shaft gear and improve NVH (noise, vibration, harshness).

Specifically, the output direction of the drive motor is adjusted according to the attribute of the torque compensation signal output by the control unit, and the output value of the drive motor is adjusted to the minimum difference between the actual torque Tact of the engine and the required torque Treq of the engine. A relationship between compensation torque Tc and vehicle speed can be determined in the early stages and stored in the memory. The torque speed relationship is determined by simulation and testing. Since the working point of the engine may be changed after the compensation torque Tc is added, the drive motor and the engine cannot work together in high-efficiency, affecting the fuel economy of the whole vehicle. Therefore, repeated tests are required in the torque determination process, and a smaller compensation torque Tc will be selected to give priority to ensuring the engine efficiency to find the optimal torque, so as to achieve a better level of fuel economy and NVH performance.

On the other hand, the embodiment of the present disclosure also provides a control system of a hybrid power system, which operates the control method of the hybrid power system as follows to control the hybrid power system of electric vehicle:

At step S1, a control unit obtains a real-time vehicle mode signal, vehicle speed data and actual torque Tact data of an engine.

At step S2, the control unit determines whether a power system of a vehicle is in parallel mode according to the vehicle mode signal, if the power system of a vehicle is in a parallel mode, the control unit sends a torque compensation signal to a drive motor and controls the drive motor to output compensation torque Tc; if the power system of the vehicle is not in the parallel mode, the control unit sends a zero torque signal to the drive motor and controls the drive motor to output zero torque.

At step S3, the control unit determines the positive and negative attributes of the torque compensation signal according to the vehicle speed data and the actual torque Tact data of the engine, and adjusts the compensated torque Tc output value of the drive motor in real time.

Figure 1:
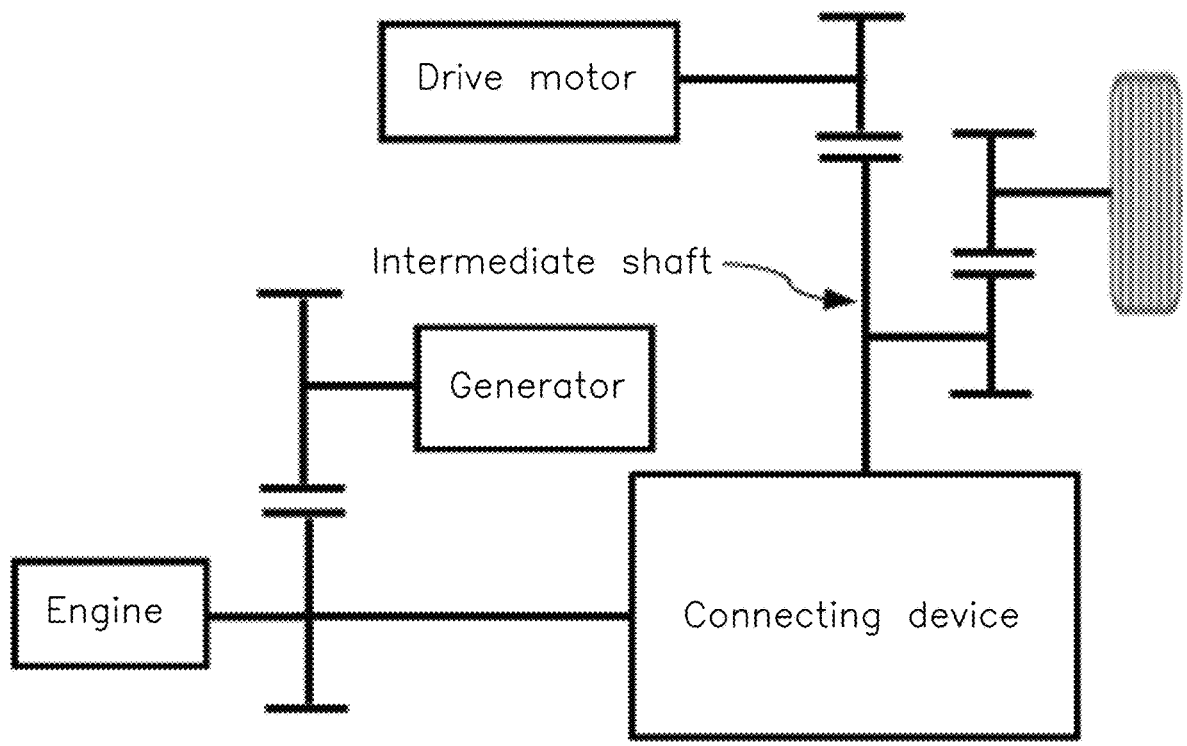
FIG. 1 is a schematic diagram of a parallel working mode of a hybrid power system in prior art.

For more details, please refer to the foregoing description of FIGS. 1-3, which will not be repeated here.

On the other hand, the embodiment of the present disclosure also provides an electric vehicle with the control system of the hybrid power system.

To sum up, the embodiment of the present disclosure has the following beneficial effects:

The control method, control system and electric vehicle of the hybrid power system provided by the present disclosure, the hybrid power configuration is under the parallel working condition of medium and high speed and uniform speed, controls the reverse output small torque of the drive motor (EM2), makes the rotor gear of the drive motor (EM2) closely fit the gear of the engine (ICE), and prevents the abnormal sound of tooth knocking of the gear connected between the drive motor (EM2) and the engine (ICE), greatly improve NVH (noise, vibration, harshness) when driving the whole vehicle.

The above disclosure is only a preferred embodiment of the present disclosure, which of course cannot limit the scope of the present disclosure. Therefore, the equivalent changes made according to the claims of the present disclosure still belong to the scope of the present disclosure.

What is claimed is:

1. A control method of a hybrid power system appliable in a hybrid power system with series parallel configuration, wherein the method comprises following steps:
    step S1, obtaining a real-time vehicle mode signal, vehicle speed data and actual torque data of an engine by a control unit;
    step S2, determining whether a power system of a vehicle is in parallel mode according to the vehicle mode signal by the control unit, if the power system of the vehicle is in the parallel mode, sending a torque compensation signal to a drive motor and controls the drive motor to output compensation torque by the control unit; if the power system of the vehicle is not in the parallel mode, sending a zero torque signal to the drive motor and controls the drive motor to output zero torque by the control unit;
    step S3, determining positive and negative attributes of the torque compensation signal according to the vehicle speed data and the actual torque data of the engine by the control unit and adjusting compensated torque output value of the drive motor in real time by the control unit;
    wherein the determining positive and negative attributes of the torque compensation signal, comprises:
    comparing a real-time actual torque of the engine with a required torque of the engine;
    determining an increase of a speed of the intermediate shaft produces a positive pressing force, determining the drive motor needs to output a negative direction compensation torque, the control unit outputs the torque compensation signal whose attribute is negative if the actual torque of the engine is greater than the required torque of the engine.

2. The method of claim 1, wherein in step S2, the sending a torque compensation signal to a drive motor and controls the drive motor to output compensation torque, comprises at least one of following steps:

stopping following rotation and cooperatively driving to output a driving force in a positive direction to an intermediate shaft gear by the drive motor after receiving the torque compensation signal;

stopping following rotation and outputting a resistance in a opposite direction to the intermediate shaft while generating power by the drive motor after receiving the torque compensation signal; and outputting zero torque, stops driving or power generation of a wheel, and synchronizing the wheel to follow-up after receiving the zero torque signal by the drive motor.

3. The method of claim 2, wherein in step S3, the adjusting compensated torque output value of the drive motor in real time, comprises:

adjusting output direction of the drive motor according to the attribute of the torque compensation signal output by the control unit and adjusting output value of the drive motor to a minimum difference between the actual torque of the engine and the required torque of the engine.

4. The method of claim 2, wherein in step S3, the determining positive and negative attributes of the torque compensation signal, comprises:

determining a reduction of a speed of the intermediate shaft produces a negative pressing force, determining the drive motor needs to output a positive direction compensation torque, the control unit outputs the torque compensation signal whose attribute is positive if the actual torque of the engine is less than the required torque of the engine.

5. The method of claim 4, wherein in step S3, the adjusting compensated torque output value of the drive motor in real time, comprises:

adjusting output direction of the drive motor according to the attribute of the torque compensation signal output by the control unit and adjusting output value of the drive motor to a minimum difference between the actual torque of the engine and the required torque of the engine.

6. A control system of a hybrid power system, wherein the control system operates the method according to claim 1 to control an electric vehicle hybrid system.

7. An electric vehicle, wherein the electric vehicle comprises the control system of the hybrid power system according to claim 6.

* * * * *